United States Patent
Meier et al.

(10) Patent No.: US 6,425,072 B1
(45) Date of Patent: Jul. 23, 2002

(54) SYSTEM FOR IMPLEMENTING A REGISTER FREE-LIST BY USING SWAP BIT TO SELECT FIRST OR SECOND REGISTER TAG IN RETIRE QUEUE

(75) Inventors: Stephan Meier, Sunnyvale; Chetana N. Keltcher, Cupertino, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/387,026

(22) Filed: Aug. 31, 1999

(51) Int. Cl.[7] .................................................. G06F 9/30
(52) U.S. Cl. ........................................................ 712/218
(58) Field of Search ........................................ 712/218

(56) References Cited

U.S. PATENT DOCUMENTS

| | | | | |
|---|---|---|---|---|
| 4,916,652 A | * | 4/1990 | Schwarz et al. | 712/218 |
| 5,463,745 A | * | 10/1995 | Vidwans et al. | 712/218 |
| 5,872,949 A | * | 2/1999 | Kikuta et al. | 712/218 |
| 5,946,468 A | * | 8/1999 | Witt et al. | 712/218 |
| 5,951,670 A | * | 9/1999 | Glew et al. | 712/218 |
| 6,098,167 A | * | 9/2000 | Cheong et al. | 712/218 |

OTHER PUBLICATIONS

Popescu, Val et al., *The Metaflow Architecture*, IEEE Micro, Jun. 1991, pp. 10–13 & 63–73.*

* cited by examiner

Primary Examiner—Richard L. Ellis
(74) Attorney, Agent, or Firm—Conley, Rose & Tayon, PC; B. Noël Kivlin

(57) ABSTRACT

An apparatus and method for implementing a register free list scheme is provided. An instruction received in an execution unit can be assigned an absolute register number as its destination register. A new physical register tag from a free list can be assigned to the absolute register number and a tag future file can be updated with the new physical register tag. The old physical register tag can be read from the tag future file and stored in a retire queue entry corresponding to the instruction along with the new physical register tag and an architectural register identifier corresponding to the absolute register number. A valid bit corresponding to the entry can be set in response to the entry being written. In response to an abort signal, a swap bit corresponding to the entry can be set, the valid bit can be reset, and the new physical register tag can be conveyed to a rename unit in response to receiving a free register request. In response to the entry being retired prior to receiving an abort signal, the valid bit corresponding to the entry can be reset and the old physical register tag can be conveyed to a rename unit in response to receiving a free register request.

35 Claims, 14 Drawing Sheets

|   | Valid | Swap | Reg. Ident. | To Be Written | To Be Freed |   |
|---|---|---|---|---|---|---|
| 902A |  |  |  |  |  | ← Retire 904 |
| 902B |  |  |  |  |  |  |
| 902C |  |  |  |  |  | ← Free List 906 |
| ⋮ | ⋮ | ⋮ | ⋮ | ⋮ | ⋮ |  |
| 902(N) |  |  |  |  |  |  |
|   | 910 | 912 | 914 | 916 | 918 |  |

*Fig. 4A*   ↘ 316

| Valid | Swap | Reg. Ind. | To Be Written | To Be Freed |
|---|---|---|---|---|
| 0 | 0 |  |  | 16 |
| 0 | 0 |  |  | 17 |
| 0 | 0 |  |  | 18 |
| 0 | 0 |  |  | 19 |
| 0 | 0 |  |  | 20 |
| 0 | 0 |  |  | 21 |

← Retire
← Free List

| Valid | Swap | Reg. Ind. | To Be Written | To Be Freed |
|---|---|---|---|---|
| 1 | 0 | R3 | 16 | 2 |
| 0 | 0 |  |  | 17 |
| 0 | 0 |  |  | 18 |
| 0 | 0 |  |  | 19 |
| 0 | 0 |  |  | 20 |
| 0 | 0 |  |  | 21 |

← Retire
← Free List

| Valid | Swap | Reg. Ind. | To Be Written | To Be Freed |
|---|---|---|---|---|
| 0 | 0 | R3 | 16 | 2 |
| 0 | 0 | R3 | 17 | 3 |
| 1 | 0 | R5 | 18 | 4 | ← Retire
| 1 | 0 | R2 | 19 | 5 |
| 0 | 0 | | | 20 | ← Free List
| 0 | 0 | | | 21 |

| Valid | Swap | Reg. Ind. | To Be Written | To Be Freed |
|---|---|---|---|---|
| 0 | 0 | R3 | 16 | 2 |
| 0 | 0 | R3 | 17 | 3 |
| 0 | 1 | R5 | 18 | 4 | ← Retire / ← Free List
| 0 | 1 | R2 | 19 | 5 |
| 0 | 0 | | | 20 |
| 0 | 0 | | | 21 |

SYSTEM FOR IMPLEMENTING A REGISTER FREE-LIST BY USING SWAP BIT TO SELECT FIRST OR SECOND REGISTER TAG IN RETIRE QUEUE

BACKGROUND OF THE INVENTION

1. Field of the Invention

This invention relates generally to the field of microprocessors and, more particularly, to execution units within microprocessors.

2. Description of the Related Art

Microprocessors are typically designed to include a limited number of architectural registers. Architectural registers are often used by instructions to store intermediate and final results prior to storing the results to a cache or a main memory. Instructions often write results to at least one destination register. Consequently, the limited number of architectural registers, can limit the number of instructions that can be in flight in a microprocessor since most instructions will require at least one physical register for a destination register. The number of architectural registers can further limit the number of instructions in flight when register dependencies arise. Dependencies can arise when two or more instructions attempt to access or update the same register.

A register renaming scheme can be implemented to more efficiently use a limited number of architectural registers. A register renaming scheme can allow more instructions to be in flight in a microprocessor and can reduce latencies from register dependencies. Generally speaking, register renaming schemes work by assigning one or more physical registers in place of architectural registers and tracking these register assignments. An architectural register list can be used to track the register assignments to determine which physical register or registers contain the contents of a particular architectural register at any given time. Processors may include more physical registers than architectural registers. The physical registers can be continually reused when they no longer comprise part of the current state, also referred to as the architectural state, of the microprocessor. Physical registers that do not comprise part of the architectural state can comprise part of the speculative state. Generally speaking, the speculative state of a physical register can be committed to the architectural state when the instruction corresponding to the physical register is retired.

Microprocessors will often be required to abort instructions that comprise the speculative state. When an abort is received, the physical registers that comprise the speculative state must be restored to a non-speculative state to allow the microprocessor to continue to execute instructions following the abort. Restoring physical registers to a non-speculative state can be a difficult and complex process. The process can consume a large number of execution latencies. An apparatus and method for reducing the latency following an abort is needed.

SUMMARY

The problems outlined above are in large part solved by an apparatus and method as described herein. Generally speaking, an apparatus and method for implementing a register free list scheme is provided. An instruction received in an execution unit can be assigned an absolute register number as its destination register. A new physical register tag from a free list can be assigned to the absolute register number, and a tag future file can be updated with the new physical register tag. The old physical register tag can be read from the tag future file and stored in a retire queue entry corresponding to the instruction along with the new physical register tag and an architectural register identifier corresponding to the absolute register number. A valid bit corresponding to the entry can be set in response to the entry being written. In response to an abort signal, a swap bit corresponding to the entry can be set, the valid bit can be reset, and the new physical register tag can be conveyed to a rename unit in response to receiving a free register request. In response to the entry being retired prior to receiving an abort signal, the valid bit corresponding to the entry can be reset and the old physical register tag can be conveyed to a rename unit in response to receiving a free register request.

Broadly speaking, a retire queue is contemplated. The retire queue includes a plurality of entries. The plurality of entries include a swap bit, a valid bit, an architectural register identifier, a first register tag, and a second register tag. The retire queue also includes a free list. The free list includes the first register tag of each of the plurality of entries whose swap bit corresponds to a first value. The free list also includes the second register tag for each of the plurality of entries whose swap bit corresponds to a second value and whose valid bit corresponds to the first value.

BRIEF DESCRIPTION OF THE DRAWINGS

Other objects and advantages of the invention will become apparent upon reading the following detailed description and upon reference to the accompanying drawings in which:

FIG. 4A is a block diagram depicting an exemplary retire queue.

FIG. 7A is a first block diagram depicting an exemplary operation of the retire queue of FIG. 4A.

FIG. 7B is a second block diagram depicting an exemplary operation of the retire queue of FIG. 4A.

FIG. 7C is a third block diagram depicting an exemplary operation of the retire queue of FIG. 4A.

FIG. 7D is a fourth block diagram depicting an exemplary operation of the retire queue of FIG. 4A.

Figure 1:
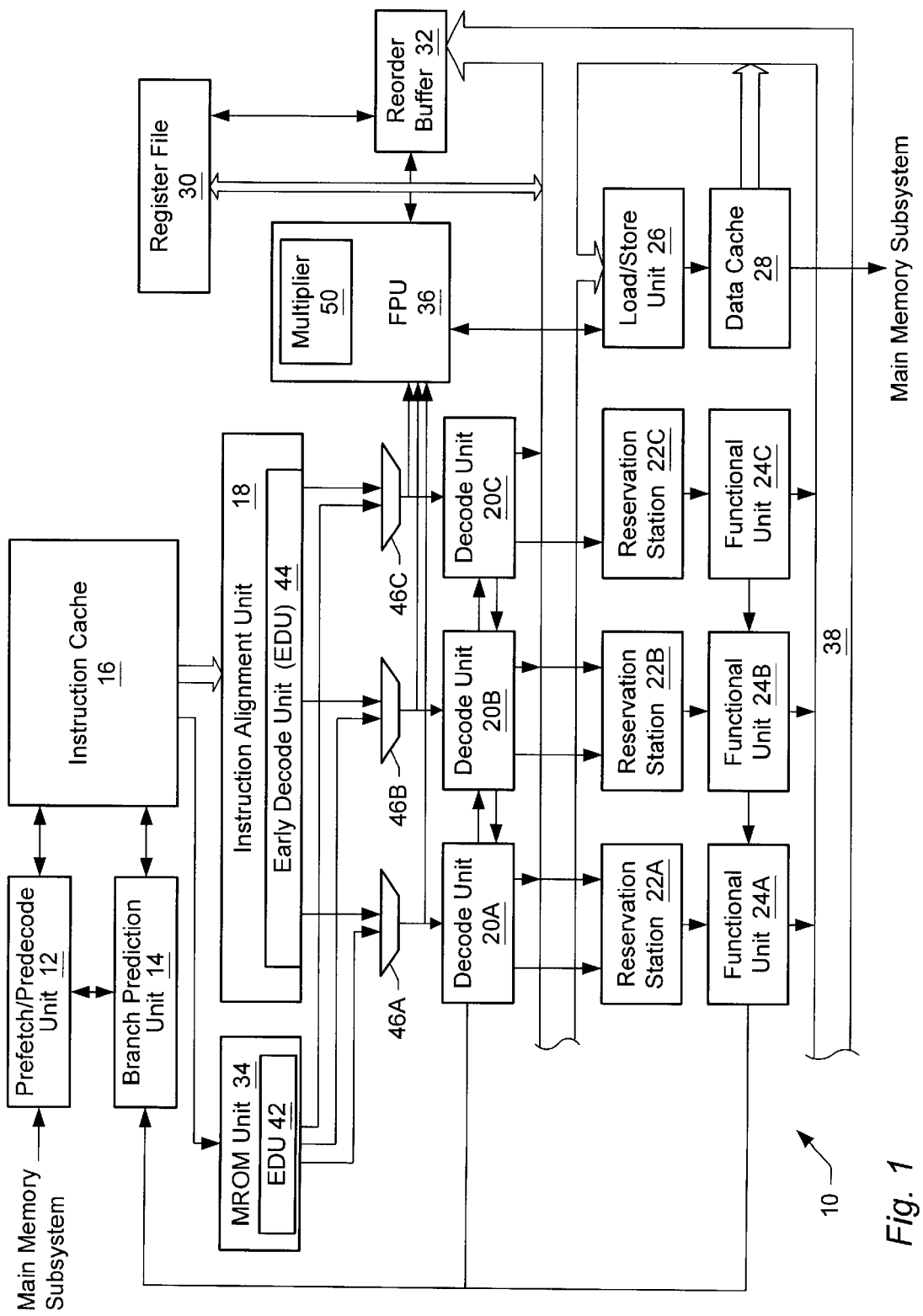
FIG. 1 is a block diagram of one embodiment of an exemplary microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating-point unit (FPU) 36, which in turn comprises multiplier 50. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42 is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12.

As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (x86 floating-point, MMX, and 3DX instructions). In one embodiment of microprocessor 10, up to three floating-point instructions per clock cycle may be conveyed to floating-point unit 36. As noted above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26. In one particular embodiment, each functional unit 24 may comprise an execution unit and an independent address generation unit. Such functional units may perform an address generation for conveyance to load/store unit 26 in parallel with the execution of an integer or branch operation.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a pre-cache load/store buffer having twelve storage locations for data and address information for pending loads or stores and a post-cache load/store buffer having 32 entries. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

Data cache 28 is a high speed cache memory provided to temporarily store data being transferred between load/store unit 26 and the main memory subsystem. In one embodiment, data cache 28 has a capacity of storing up to sixty-four kilobytes of data in a two way set associative structure. It is understood that data cache 28 may be implemented in a variety of specific memory configurations, including a set associative configuration.

Figure 2:
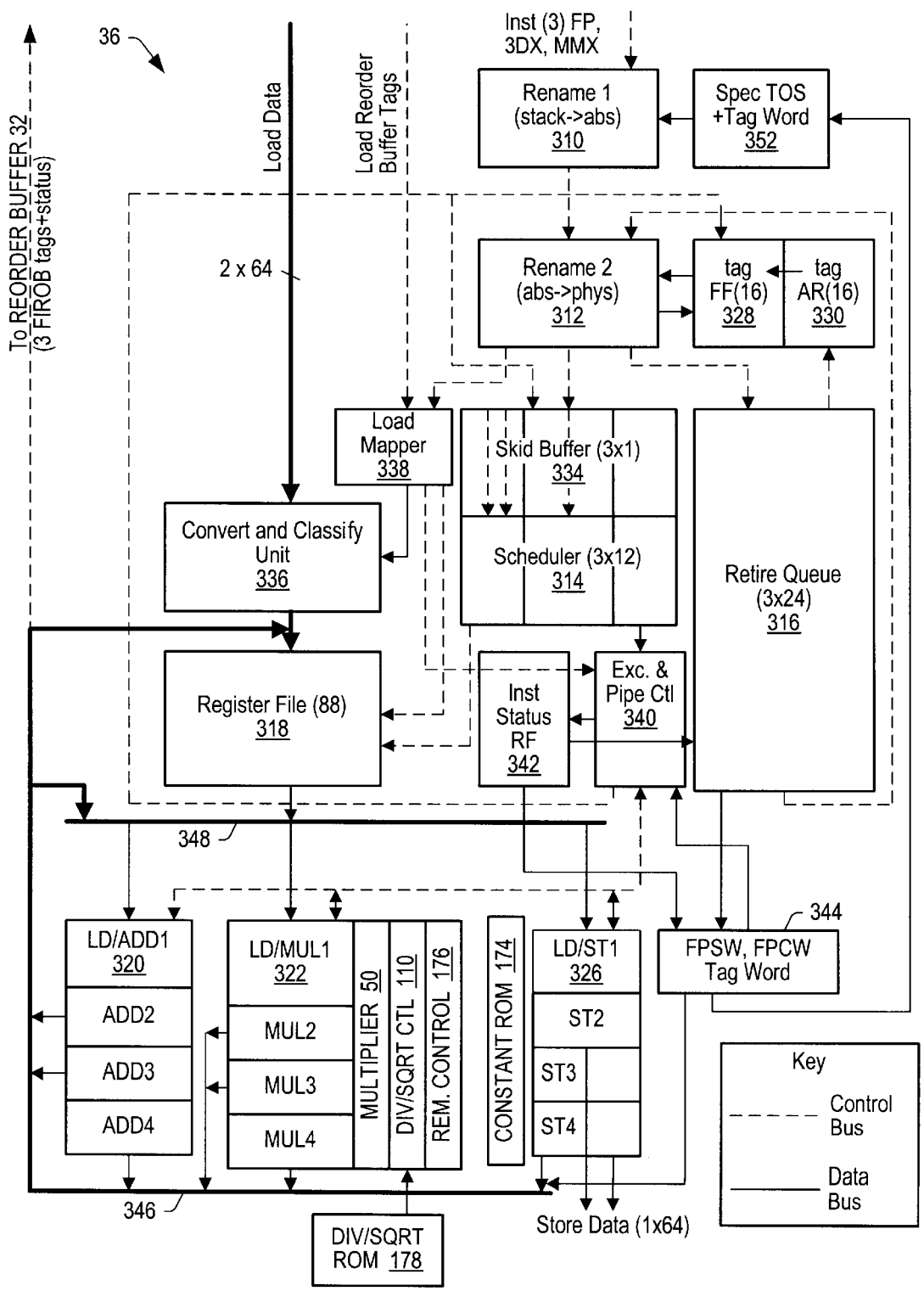
FIG. 2 is a block diagram of one embodiment of a floating-point unit from the exemplary microprocessor of FIG. 1.

Turning now to FIG. 2, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating-point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add execution pipeline 320, a load/multiply execution pipeline 322, a load/store execution pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipeline control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to execution pipelines 320, 322, and 326. Finally, execution pipelines 320, 322, and 326, and floating-point status/control/tag words 344 are all coupled to result bus 346. While floating-point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipeline control unit 340, or retire queue 316.

Rename-1 unit 310 receives up to three instructions per clock cycle. As previously noted, these may be any combination of floating-point, MMX, or 3DX instructions. Rename-1 unit 310 converts stack-relative registers into absolute register numbers. For instructions with memory operands, e.g., FLD instructions (floating-point load), no conversion is necessary and the source operand can be identified as being from memory rather than a register. The x86 instruction set and architecture defines eight floating-point registers that are accessed in a stack-like manner (i.e., relative to a top-of-stack pointer). Rename-1 unit 310 also assigns each instruction to one of three execution pipelines, either load/store execution pipeline 326, load/add execution pipeline 320, or load/multiply execution pipeline 322 and, if necessary, converts each instruction to an internal format.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating-point stack or MMX registers) and eight are micro-architectural registers (i.e., registers that store internal state information that is not generally accessible to the programmer). The old destination register tags are then read from the tag future file 328 and written to the tail of the free list. Finally, tag future file 328 is updated by storing tags for the new destination to registers.

Memory operands may be handled by assigning them the same register tag as the destination register. This is because load data will be converted and directly written into the destination register when it is received from load/store unit 26. In the case of an FLD instruction, no further processing is required (except in certain exceptional cases), although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Scheduler 314 may also snoop load data bus. Concurrently with allocating the line of storage and snooping, retire queue 316 allocates one entry for each instruction. The entries store the destination register tags, the absolute destination register number, and the old destination register tags. Additional information may also be included, e.g., information that may be needed to update the architectural state at retire time.

On the cycle following their entry into scheduler 314, the instructions are available for scheduling. Scheduler 314 examines all of the stored instructions and issues the oldest instructions which meet the following criteria: (1) the execution pipeline to which the instruction has been assigned is available, (2) the result bus for that execution pipeline will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. Each of the three execution pipelines 320, 322, and 326 may accept a new instruction every clock cycle. Note other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding or superforwarding. Result forwarding involves conveying the results from a recently executed instruction directly to other instructions that depend upon that result. Result forwarding allows the result to be used in subsequent instructions without having to wait for the result to be stored in a register and having to read the result from the register. Result superforwarding will be described in more detail below.

Each execution pipeline 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each execution pipeline may begin performing the appropriate computation.

In the embodiment shown in the figure, execution pipeline 320 is configured to perform load and addition operations, execution pipeline 322 is configured to perform load and multiplication operations, and execution pipeline 326 is configured to perform load and store operations. Both execution pipelines 320 and 322 may be configured to perform certain MMX instructions. Execution pipeline 322, which comprises multiplier 50, may also be configured to perform iterative calculations that involve multiplication, e.g., reciprocal operations, division operations, and square root operations, under the control of control unit 116, division/square root ROM 178, and, if a remainder is called for, remainder control unit 176. Constant ROM 174 is a read only memory configured to store a plurality of constants for load constant instructions such as FLDPI, for transcendental computation, for FPU 36 self-checking, and for certain special and exceptional results. Division/square root ROM 178 is a read only memory which stores constants used to determine initial values for division and square root computations and constants returned by certain 3DNow! instructions. Control unit 110 provides sequence information for division and square root functions. Note, in some embodiments control unit 110 may be part of execution and pipeline control unit 340.

In some cases, instruction operands or the results generated by executing an instruction may be too small to fit within the operand or result's standard data format. These numbers are referred to as "denormals". While normalized floating-point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated during execution within execution pipelines 320, 322, and 326 are tagged when they are generated. Execution and pipeline control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating-point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating-point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the characteristics of each data type for x86 compatible floating-point units (wherein "x" represents either a one or a zero):

| Sign | Exponent | Significand | Value |
|---|---|---|---|
| x | $00...00_2$ | $0.00...00_2$ | Zero |
| x | $11...11_2$ | $1.00...00_2$ | Infinity |
| x | $11...11_2$ | $1.1xx...xx_2$ | QNaN |
| x | $11...11_2$ | $1.0xx...xx_2$ | SNaN |
| x | $00...00_2$ | $0.xx...xx_2$ | Denormal |

It is noted that these data types may conform to the IEEE-754 specification.

MMX data types are 64 bits wide and comprise either eight packed 8-bit bytes, four packed 16-bit words, or two packed 32-bit double-words. MMX data types may be detected by the MMX opcodes which precede them. Normal data types are standard floating-point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (f.ff . . . ff) of 0.11 . . . 11 is an unsupported value. Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a physical register tag. The physical register tag indicates which data register within register file 318 the corresponding data is to be loaded into.

Execution and pipeline control unit 340 tracks the status of each stage in execution pipelines 320, 322, and 326. Execution and pipeline control unit 340 contains timing information enabling it to determine the future availability of each execution pipelines. For example, when an FMUL (floating-point multiply) instruction begins execution in multiplication execution pipeline 322, control unit 340 uses its stored timing information to notify scheduler 314 that the result will be available for output on result bus 346 four clock cycles later. This timing information allows scheduler 314 to efficiently schedule instruction for execution in execution pipelines 320, 322, and 326. Control unit 320 also tracks the status of each pipe stage, receiving and prioritizing exceptions from execution pipelines 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 of them store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipeline control unit 340. As a result of instructions executing out of order in FPU 36, exceptions that occur within execution pipelines may need to be stored until the instructions generating them are the next to be retired. Retire queue 316 reads instruction status register file 342 when it retires instructions and updates the architectural floating-point status word (FPSW) and floating-point control word (FPCW) and tag word (collectively, 344) accordingly. This information is conveyed to rename-1 unit along with the current speculative top of stack 352 and on result bus 346.

Figure 3:
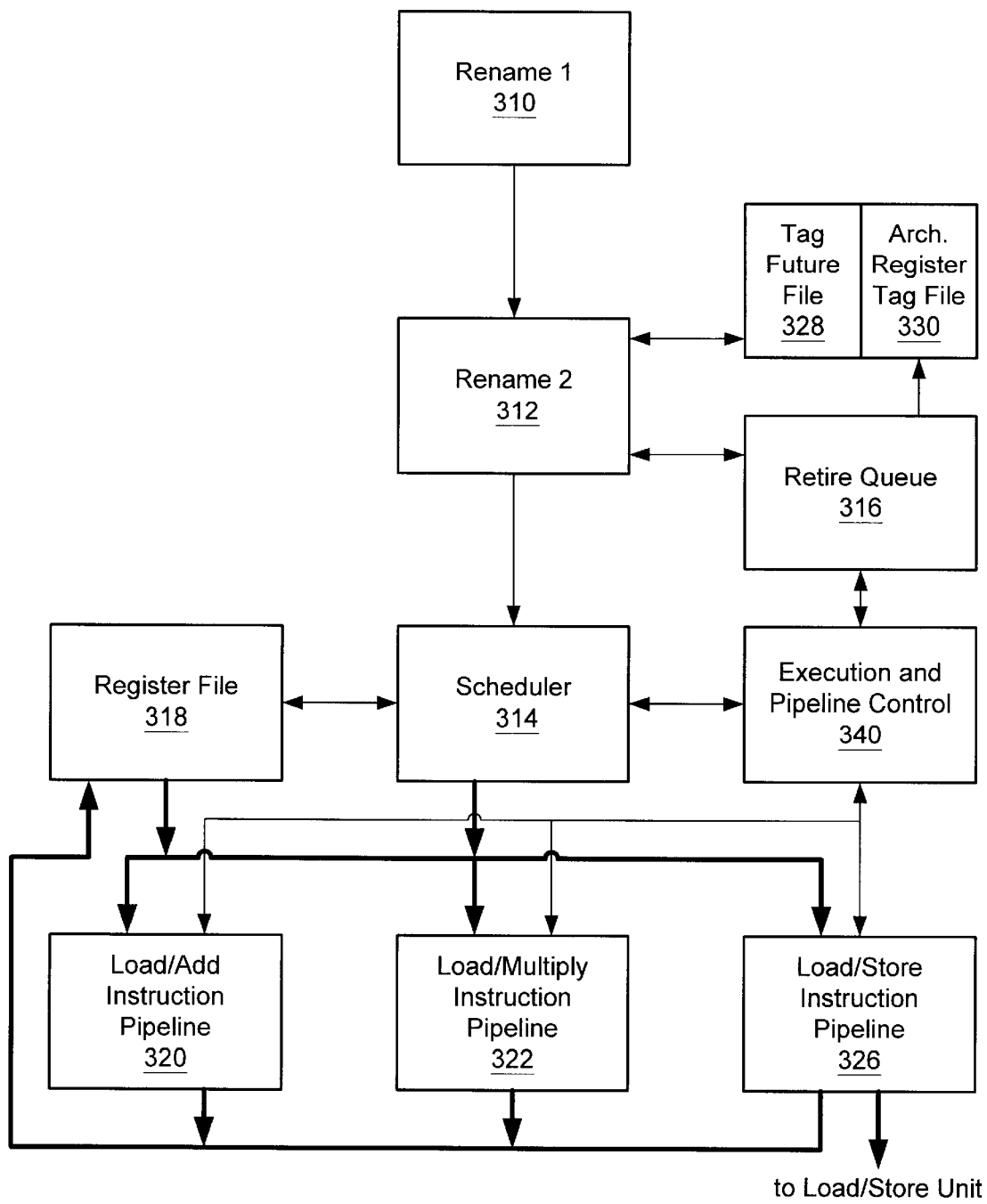
FIG. 3 is a block diagram depicting portions of the floating-point unit of FIG. 2.

Turning now to FIG. 3, a block diagram depicting one embodiment of portions of the floating-point unit of FIG. 2 is shown. FIG. 3 depicts rename 1 unit 310, rename 2 unit 312, scheduler 314, load/add instruction pipeline 320, load/multiply instruction pipeline 322, load/store instruction pipeline 326, register file 318, execution and pipeline control 340, retire queue 316, tag future file 328, and architectural register tag file 330. As indicated in FIG. 3, rename 1 unit 310 is coupled to rename 2 unit 312. Rename 2 unit 312 is coupled to scheduler 314, retire queue 316, and tag future file 328. Scheduler 314 is coupled to register file 318, execution and pipeline control 340, load/add instruction pipeline 320, load/multiply instruction pipeline 322, and load/store instruction pipeline 326. Register file 318 is coupled to load/add instruction pipeline 320, load/multiply instruction pipeline 322, and load/store instruction pipeline 326. Execution and pipeline control 340 is coupled to retire queue 316, load/add instruction pipeline 320, load/multiply instruction pipeline 322, and load/store instruction pipeline 326. Retire queue 316 is coupled to architectural register tag file 330. Architectural register tag file 330 is coupled to tag future file 328. It can be noted that other types of execution units may employ similar configurations.

As noted above, FPU 36 is configured to receive and execute floating-point instructions. These instructions can be received in rename 1 unit 310. Rename 1 unit 310 can be configured to convert stack-relative registers corresponding to the instructions to absolute register numbers. Rename 1 unit 310 can also be configured to convey a free list register request signal to retire queue 316 for each instruction that includes a destination register. In the embodiment of FIG. 3, the free list register request signal or signals are configured to pass through rename 2 unit 312. Other embodiments may convey the request signals directly to retire queue 316. From rename 1 unit 310, instructions can be conveyed to rename 2 unit 312.

Rename 2 unit 312 can be configured to receive instructions from rename unit 310 and to assign register tags from a free list to the destination registers of the instructions. Instructions that do not include a destination register, such as floating-point store instructions, can be assigned a designated absolute register number. Rename 2 unit 312 can be configured to interface tag future file 328 to read the register tags corresponding to the absolute register numbers for each source and destination register of each instruction using the architectural register identifiers. Rename 2 unit 312 can also be configured to update tag future file 328 with the register tags from the free list that were assigned to the destination registers of the instructions. From rename 2 unit 312, instructions can be written to scheduler 314. Retire data corresponding to each instruction can also be written to an entry in retire queue 316. In one embodiment, retire data includes the absolute register number identifier, the assigned destination register tag from the free list, and the old destination register tag from tag future file 328. Other embodiments may include other information in the retire data such as a top of stack pointer or instruction specific data.

Scheduler 314 can be configured to receive the instructions from rename 2 unit 312. Scheduler 314 can schedule the floating-point store instruction according to the criteria discussed above with regard to FIG. 2. Once scheduled, the floating-point store instruction can be issued to load/add instruction pipeline 320, load/multiply instruction pipeline 322, or load/store instruction pipeline 326 as determined in rename 1 unit 310. Instructions can be configured to read their source registers by indexing register file 318 using the register tags read from tag future file 328. Instructions can also be configured to read their source registers from one or more bypass buses (not shown) where register forwarding or superforwarding has been implemented.

Once instructions completed execution, results for each instruction can be conveyed on a result bus to register file 318. Results can be written to the register in register file 318 that corresponds to the register tag assigned to the destination register of each instruction by the free list. Results can also be conveyed to load/store unit 26 for storage in data cache 28 or main memory (not shown).

Load/add instruction pipeline 320, load/multiply instruction pipeline 322, and load/store instruction pipeline 326 can be configured to convey a completion signal for each instruction to execution and pipeline control 340. Execution and pipeline control 340 can be configured to convey completion information to retire queue 316 and reorder buffer 32 (as shown in FIG. 1). The completion information for each instruction can include a reorder buffer tag, status information, and other information. Retire queue 316 can be configured to retire an instruction in response to receiving a signal from reorder buffer 32 (as shown in FIG. 1). In one embodiment, retire queue 316 can be configured to retire an instruction by conveying the architectural register identifier and a register tag to architectural register tag file 330. Retire queue 316 can also be configured to update the floating-point status register in floating-point status/control/tag words 344 (shown in FIG. 2) in response to retiring an instruction.

Turning now to FIG. 4A, a block diagram depicting an exemplary retire queue is shown. Other embodiments are possible and contemplated. Retire queue 316 is depicted and comprises a plurality of entries 902A–902(N) (referred to collectively as a plurality of entries 902 or separately as an entry 902), a retire pointer 904, and a free list pointer 906. Retire queue 316 can comprise any number of entries as indicated by entry 902(N) where N is equal to the number of entries. Retire queue also includes a plurality of valid bits 910, a plurality of swap bits 912, a plurality of architectural register identifiers 914, a plurality of to be written register tags 916, and a plurality of to be freed register tags 918. As can be seen in FIG. 4A, each entry in retire queue 316 includes a valid bit 910, a swap bit 912, an architectural register identifier 914, a to be written register tag 916, and a to be freed register tag 918. In one embodiment, retire queue 316 contains 45 entries. In one particular embodiment, retire queue 316 contains 45 entries organized as 15 rows of three entries per row.

Retire queue 316 can be configured to receive and store retire data for each of a plurality of instructions. In one embodiment, retire data can comprise an architectural register number, a new register tag, and an old register tag. Other embodiments may include or exclude other information as part of the retire data. For a particular instruction, retire queue 316 can be configured to store retire data corresponding to that instruction into an entry. More specifically, retire queue 316 can be configured to store the architectural register number as the architectural register identifier 914, the new register tag as the to be written register tag 916, and the old register tag as the to be freed register tag 918. Retire queue can also be configured to set the valid bit for that entry upon storing the retire data.

Retire pointer 904 can be configured to correspond to the entry that contains retire data for the oldest entry in retire queue 316. The oldest entry can be defined as a valid entry that was written prior to the remaining valid entries in retire queue 316. Put differently, the oldest entry contains retire data corresponding to the oldest floating-point, MMX or 3DX instruction, in program order. In response to the oldest entry being retired, i.e. the retire data of the entry committed to architectural state, the retire pointer can be updated to correspond to the oldest remaining entry in retire queue 316.

Free list pointer 906 can be configured to correspond to the top of a free list of register tags. As noted above in FIG. 3, retire queue 316 can be configured to convey register tags from a free list to rename 2 unit 312. The free list generally includes register tags from to be freed register tags 918 for each entry that does not contain valid retire data, i.e. the valid bit is not set for that entry. The free list may include, however, the to be written register tag 916 instead of the to be freed register tag 918 for certain invalid entries as will be described in more detail below. In response to conveying a register tag from the free list, free list pointer 906 can be configured to correspond to the next register tag in the free list. Retire queue 316 can be configured to convey this next register tag in response to receiving a subsequent free register request.

In one embodiment, either the to be written register tag 916 or the to be freed register tag 918 for each entry whose valid bit 910 is not set, i.e. for each invalid entry, can be included in the free list. For each invalid entry, the to be freed register tag 918 can be included in the free list for each entry whose swap bit 912 is not set, and the to be written register tag 916 can be included in the free list for each entry whose swap bit 912 is set. Put differently, the register tag from to be freed register tag 918 can be included in the free list for each entry that does not contain valid retire data unless the swap bit 912 is set for that entry. If the swap bit 912 is set for that entry, then the to be written register tag 916 for that entry can be included in the free list. For example, if entry 902A's valid bit 910 is not set and entry 902A's swap bit 912 is not set, then entry 902A's to be freed register tag 918 can be included in the free list. If, on the other hand, entry 902A's valid bit 910 is not set and entry 902A's swap bit 912 is set, then entry 902A's to be written register tag 916 can be included in the free list. Other embodiments may include or exclude register tags from the free list based on other values of valid bit 910 and swap bit 912.

Retire queue 316 can employ swap bit 912 to advantageously prevent register tags that have been speculatively freed from being added to the free list following an abort. In response to an abort signal, retire queue 316 can be configured to set the swap bit 912 for each entry whose valid bit 910 is set. As a result, the to be written register tag 916 can be added to the free list instead of the to be freed register tag 318 for each valid entry. In this manner, retire queue 316 may be able to advantageously prevent register tags that have been speculatively freed from being added to the free list following an abort.

Figure 4B:
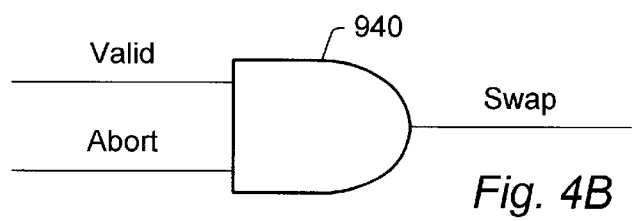
FIG. 4B is a block diagram of a first embodiment of one portion of the retire queue of FIG. 4A.

Turning to FIG. 4B, a block diagram of a first embodiment of one portion of the retire queue of FIG. 4A is shown. Other embodiments are possible and contemplated. FIG. 4B includes a logical AND gate 940. As shown, logical AND gate 940 is coupled to receive a valid signal and an abort signal and is coupled to output a swap signal.

FIG. 4B depicts a first embodiment of a circuit configured to set swap bit 912 in response to an abort signal. Logical AND gate 940 can receive the value of valid bit 910 for an entry in retire queue 316. In response to receiving an abort signal, the output value (swap signal) of logical AND gate 940 can be stored in swap bit 912 for the entry corresponding to the valid bit 910.

Figure 4C:
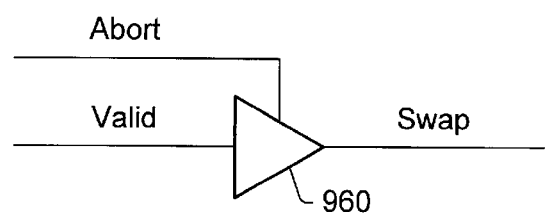
FIG. 4C is a block diagram of a second embodiment of one portion of the retire queue of FIG. 4A.

Turning to FIG. 4C, a block diagram of a second embodiment of one portion of the retire queue of FIG. 4A is shown. Other embodiments are possible and contemplated. FIG. 4C includes a buffer 960. As shown, buffer 960 is coupled to receive a valid signal and an abort signal and to output a swap signal.

FIG. 4C depicts a second embodiment of a circuit configured to set swap bit 912 in response to an abort signal. Buffer 960 can receive the value of valid bit 910 for an entry in retire queue 316. In response to receiving an abort signal, buffer 960 can convey the value of valid bit 910 as a swap signal. The swap signal can be stored in swap bit 912 for the entry corresponding to the valid bit 910.

Figure 5:
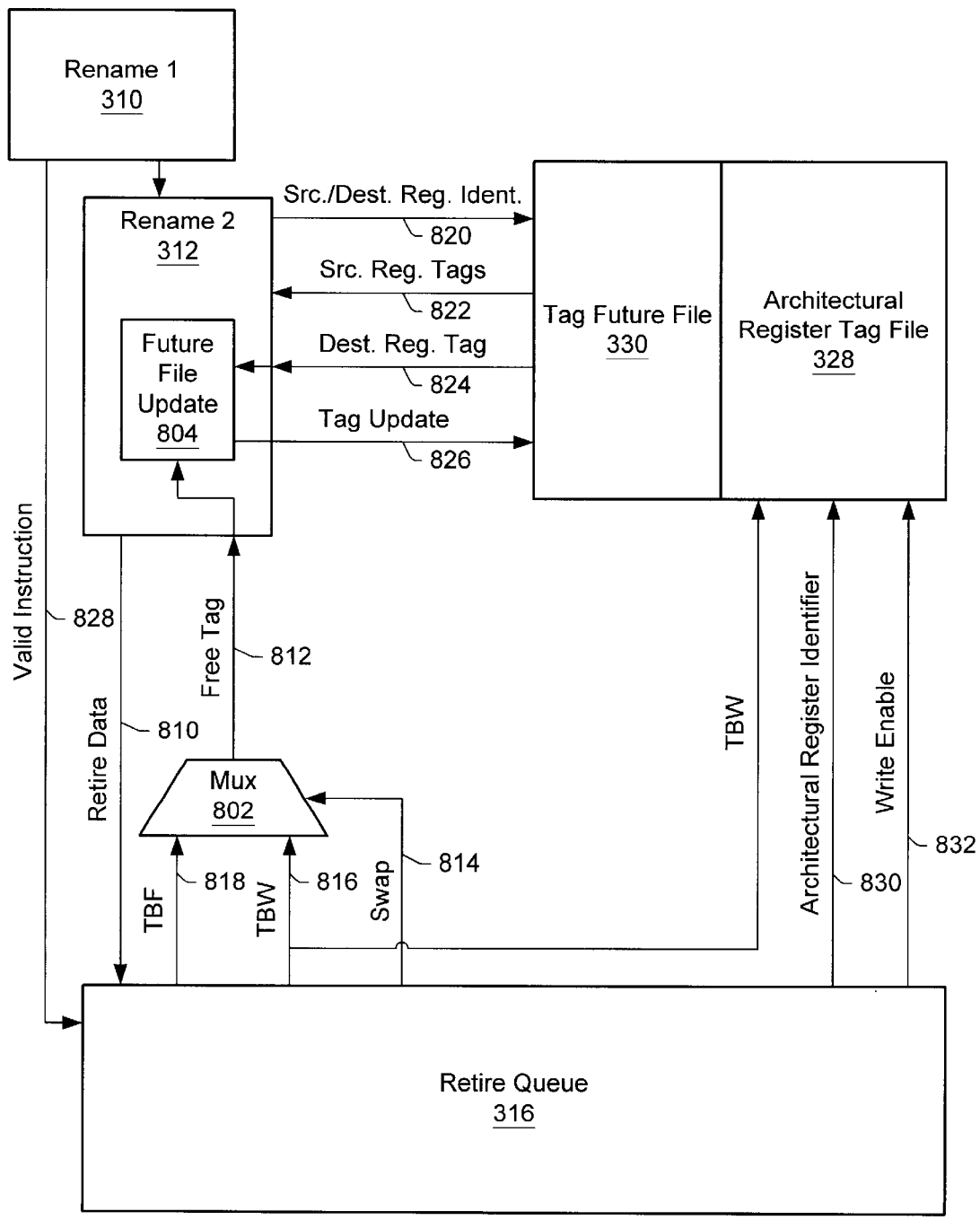
FIG. 5 is a block diagram depicting portions of the floating-point unit of FIG. 2.

Turning to FIG. 5, a block diagram depicting portions of the floating-point unit of FIG. 2 is shown. FIG. 5 depicts rename 1 unit 310, rename 2 unit 312, retire queue 316, architectural register tag file 328, tag future file 330, and multiplexer (mux) 802. Rename 2 unit 312 includes future file update 804. Rename 1 unit 310 is coupled to rename 2 unit 312. Rename 1 unit 310 is also coupled to retire queue 316 via valid instruction signal 828. Rename 2 unit 312 is coupled to retire queue 316 via retire data 810. Rename 2 unit 312 is also coupled to source/destination register identifiers 820 and tag update 826. Retire queue 316 is coupled to multiplexer 802 via TBF (to be freed) 818, TBW (to be written) 816, and swap 814. Retire queue is also coupled to architectural register file 328 via TBW 316, architectural register identifier 830, and write enable 832. Tag future file 330 is coupled to rename 2 unit 312 via source register tags 822 and destination register tag 824. Multiplexer 802 is coupled to rename 2 unit 312 via free tag 812. Future file update 804 is coupled to destination register tag 824, free tag 812, and tag update 826. Each interconnection described herein should be construed to include a plurality of signals (i.e. a bus or multiple connections) where appropriate. Other interconnections are possible and contemplated.

In response to receiving a valid instruction in rename 1 unit 310, rename 1 unit 310 can be configured to convey a valid instruction signal 828 to retire queue 316. In one embodiment, valid instruction signal 828 can be routed through rename 2 unit 312. Retire queue 316, in response to receiving the valid instruction signal 828, can be configured to convey a free register tag via free tag 812. Retire queue 316 can be configured to convey the free register tag from the entry corresponded to by the free list pointer as discussed above in FIG. 4A. Retire queue 316 can be configured to select the free register tag or tags from either a to be written register tag or a to be freed register tag based on a value of the swap bit for the entry. The to be freed register tag can be conveyed via TBF 818 to multiplexer 802, the to be written register tag can be conveyed via TBW 816 to multiplexer 802, and the swap bit can be conveyed to multiplexer 802 via swap 814. In one embodiment, retire queue 316 includes multiplexer 802. Retire queue 316 can also be configured to update the free list pointer in response to conveying a free register tag. In one embodiment, the free list pointer can be updated by configuring it to correspond to a next entry in the retire queue that includes a free register tag.

Rename 1 unit 310 is configured to convey the instruction to rename 2 unit 312. In response to receiving the instruction, rename 2 unit 312 can be configured to read the old physical register tag corresponding to the absolute register numbers that were assigned to the source and destination registers of the instruction in rename 1 unit 310. The old physical register tags can be read by conveying the source and destination register identifiers corresponding to the absolute register numbers to tag future file 330. In response to receiving the source and destination register identifiers, tag future file 330 can be configured to convey the old physical register tags corresponding to the source registers to rename 2 unit 312 via source register tags 822. Tag future file 330 can also be configured to convey the old physical register tag corresponding to the destination register to rename 2 unit 312 via destination register tag 824. Rename 2 unit can be configured to assign the free register tag received from retire queue 316 to the destination register of the instruction. Rename 2 unit can be configured to convey the free register tag to tag future file 330 via tag update 826. In response to receiving the free register tag, tag future file 330 can be configured to store the free register tag as the register tag corresponding to the absolute register number.

In one embodiment, the free register tag and the old physical register tag corresponding to the destination register are received in future file update 804. Future file update 804 may be configured to receive other signals or information including an abort signal or a reset signal (not shown). Future file update 804 can be configured to convey the tag update to tag future file 804 based on the free register tag, the old physical register tag corresponding to the destination register, and/or other information.

Rename 2 unit can be configured to convey retire data corresponding to the instruction to retire queue 316. In response to receiving the retire data, retire queue 316 can be configured to store the retire data in an entry. In one embodiment, retire queue 316 can be configured to store the retire data in the entry that conveyed the free register tag for the instruction. Other embodiments may store the retire data in other appropriate entries. In one embodiment, retire data can include the architectural register identifier, the old physical register tag corresponding to the destination register, and the free register tag conveyed to rename 2 unit 312 for that instruction. The free register tag can be thought of as the new physical register tag. Other embodiments may convey other data as part of the retire data. In one embodiment, retire queue is configured to store the old physical register tag in the to be freed field for the entry as described above in FIG. 4A. Similarly, retire queue 316 can also be configured to store the new physical register tag in the to be written field for the entry. Further, retire queue 316 can be configured to store the architectural register identifier in the architectural register identifier field for the entry. Other embodiments may store retire data in other fields of an entry. Retire queue 316 can be configured to set the valid and/or swap bits for the entry as described above in FIG. 4A.

In response to the entry becoming the oldest entry in the retire queue, i.e. entries corresponding to instructions earlier, in program order, to the instruction that corresponds to the entry have all been retired, retire queue 316 can be configured to retire the entry in response to receiving an instruction completion signal and a retire signal. Retire queue 316 can also be configured to include a retire pointer to correspond to the oldest entry as described above in FIG. 4A. In one embodiment, the instruction completion signal can be received from either an execution pipeline, such as load/add execution pipeline 320, load/multiply execution pipeline 322, or load/store execution pipeline 326, or a control unit, such as execution and pipeline control unit 340. The retire signal can be received from a reorder buffer such as reorder buffer 32. Other embodiments can generate an instruction completion signal or retire signal in other units. Retire queue 316 can retire the entry by conveying the new physical register tag, the architectural register identifier, and a write enable signal to architectural register tag file 328 via TBW 816, architectural register identifier 830, and write enable 832, respectively. Retire queue 316 can also be configured to set the valid bit for the entry as described above in FIG. 4A.

In response to receiving the new physical register tag, the architectural register identifier, and the write enable signal, architectural register tag file 328 can be configured to store the new. physical register tag to the register entry corresponding to the architectural register identifier. In doing so, architectural register tag file 328 can be described as committing the instruction to the architectural state of the floating-point execution unit.

In response to receiving an abort signal prior to retiring the entry for an instruction, retire queue 316 can be configured to invalidate the entry by resetting the valid bit for the entry as described above in FIG. 4A. Retire queue 316 can also be configured to update the retire pointer and the free list pointer and to set the swap bit as described above in FIG. 4A. Consequently, the to be written register tag of the entry can be added to the free list in response to an abort. If an abort signal arrives after the entry has been retired, the to be freed register tag of the entry can be included in the free list in response to the abort signal.

It can be noted that the embodiment of FIG. 5 can be configured to process multiple instructions simultaneously. For example, rename 1 unit 312 can be configured to convey multiple valid instructions to retire queue 316 via valid instruction 828 in a clock cycle and retire queue 316 can be configured to convey multiple free register tags via free tag 812 in response. It can further be noted that the embodiment of FIGS. 4A, 4B, 4C, and 5, while described in the context of a floating-point execution unit, can be configured to operate in other types of execution units.

Figure 6:
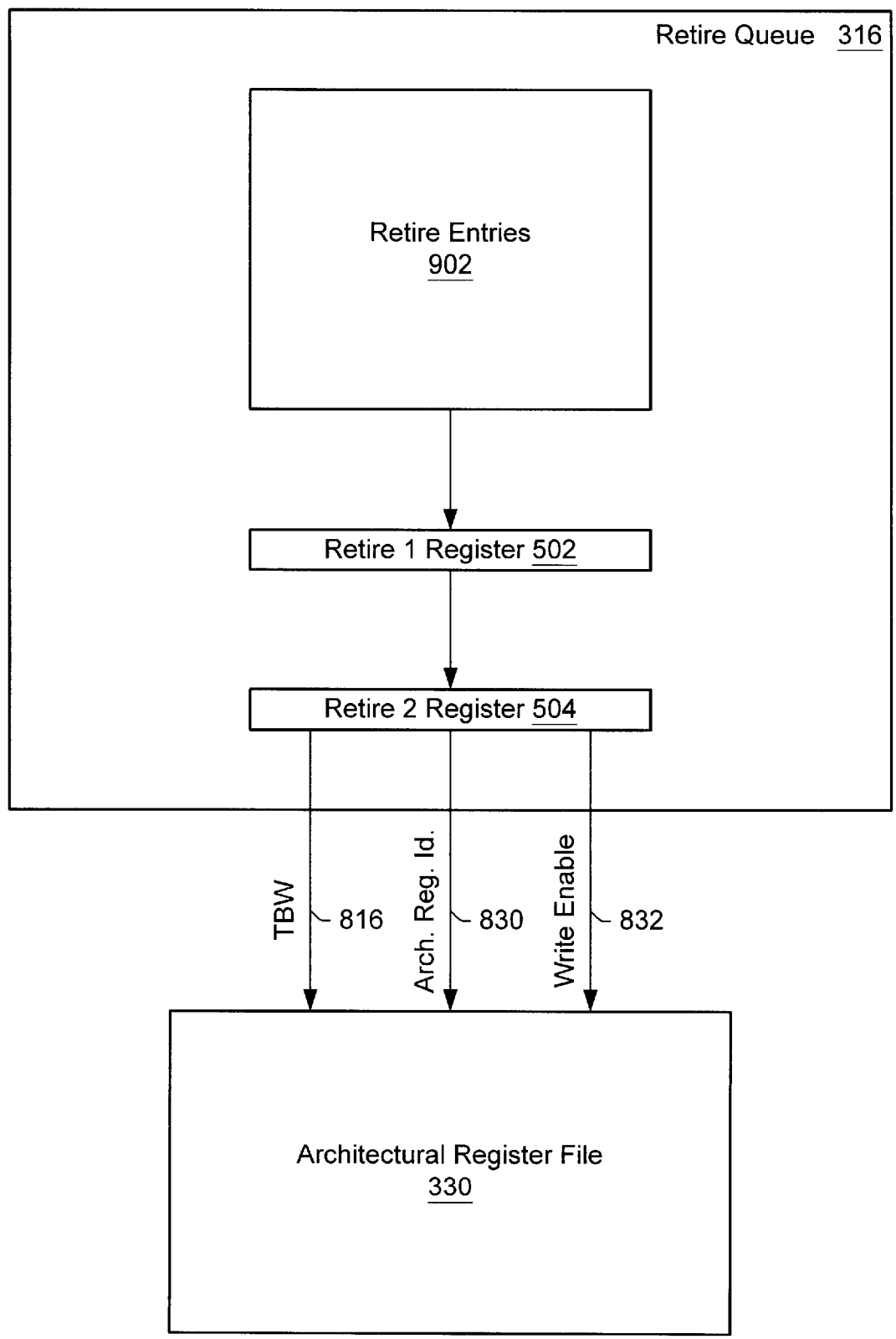
FIG. 6 is a block diagram of portions of the floating-point unit of FIG. 2.

Turning to FIG. 6, a block diagram of portions of the floating-point unit of FIG. 2 is shown. Other embodiments are possible and contemplated. FIG. 6 depicts retire queue 316 coupled to architectural register file 330 via TBW 816, architectural register identifier 830, and write enable 832. Retire queue 316 includes retire entries 902, retire 1 register 502, and retire 2 register 504. Retire 2 register can be coupled to TBW 816, architectural register identifier 830, and write enable 832 as indicated.

In the embodiment of FIG. 6, an entry or entries may be retired in a plurality of retire stages. In one embodiment, these stages include retire 0, retire 1, and retire 2. Three or more retire pointers, such as a retire 0 pointer (not shown), a retire 1 pointer (not shown), and a retire 2 pointer (not shown), may be used to implement the plurality of retire stages. In response to retire 0 pointer corresponding to an entry and the retire 1 register 502 being free, the entry can be conveyed to retire 1 register 502 in the retire 0 stage. The retire 0 pointer can be updated to correspond to the next oldest entry. In response to receiving a retire signal corresponding to the entry and the retire 2 pointer corresponding to the entry, the entry can be conveyed to retire 2 register 504. The entry can also be committed to the architectural state as described above and the retire 2 pointer can be updated. The retire 2 pointer can be used to correspond to the entry whose valid bit needs to be reset once the entry is retired. In one embodiment, the valid bit for the entry may not be reset until the entry is actually committed to the architectural state to allow for recovery of the free list following an abort. In one embodiment, each retire stage can be configured to handle up to three valid entries in parallel. A set of entries in a retire stage may be referred to as a line in retire queue 316.

Turning now to FIGS. 7A–7D, block diagrams depicting an exemplary operation of the retire queue of FIG. 4A are shown. Other operations of the retire queue are possible and contemplated.

FIG. 7A shows an initial state of retire queue 316. In FIG. 7A, the retire pointer and free list pointer correspond to the entry at the top of retire queue 316, i.e. the first entry. It can be seen that retire queue 316 does not contain any valid entries in FIG. 7A as the valid bit for each entry is set to zero. It can further be seen that retire queue 316 does not contain any speculatively freed registers as the swap bits for each entry are set to zero. In FIG. 7A, the free list includes the register tags listed in the to be freed fields (register tags: 16, 17, 18, 19, 20 and 21) of retire queue 316. In response to receiving a free register tag request for an instruction, retire queue 316 can convey register tag 16 as a free register tag.

FIG. 7B depicts retire queue 316 after it conveys register tag 16 as a free register tag and receives retire data corresponding to the instruction. In response to conveying the register tag 16, the free list pointer has been updated to correspond to the next entry, i.e. the second entry. In response to receiving retire data, retire queue 316 has stored the architectural register identifier, R3, in the architectural register identifier field in the first entry. Retire queue 316 has also stored the new physical register tag, register tag 16, in the to be written field and the old physical register tag, register tag 2, in the to be freed field in the first entry. Retire queue 316 has further set the valid bit for the first entry. The retire pointer corresponds to the first entry since it will be the next entry to be retired by retire queue 316.

FIG. 7C depicts retire queue 316 after it conveys register tags for three subsequent instructions and receives retire data for the three subsequent instructions. Retire queue 316 handles these three subsequent instructions in the same manner it handled the instruction discussed in FIG. 7B and the free list pointer has been updated accordingly. FIG. 7C also depicts the state of the first two entries in retire queue 316 after they have been retired. Accordingly, the valid bit for each of the first two entries has been reset and the retire pointer now corresponds to the third entry.

FIG. 7D depicts retire queue 316 after it has received an abort signal prior to retiring the third and fourth entries in the retire queue. In response to receiving the abort signal, retire queue 316 sets the swap bit for each valid entry in the retire queue. Accordingly, the swap bit has been set for the third and fourth entries in retire queue 316 as shown in FIG. 7D. Retire queue 316 has also invalidated all of the entries. Accordingly, the valid bits that were set for the third and fourth entries have been reset. Retire queue 316 has further reset the retire pointer and the free list pointer as they both now correspond to the third entry. In response to receiving a first free register tag request, retire queue 316 will provide the register tag from the to be written register field, register tag 18, since the free list pointer corresponds to the third entry and the swap bit is set. In response to receiving a second, third and fourth free register tag request, retire queue 316 can convey register tag 19 (from the fourth entry), register tag 20 (from the fifth entry), and register tag 21 (from the sixth entry), respectively.

Figure 8:
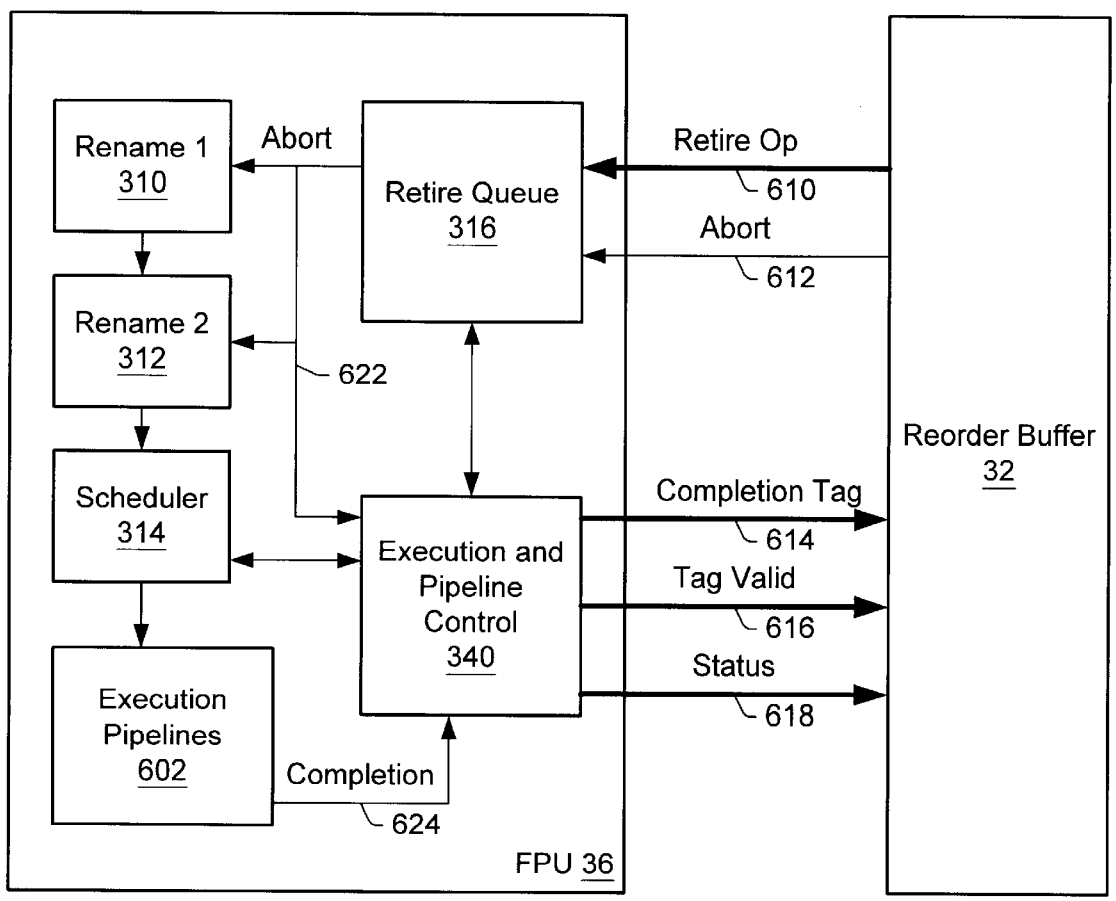
FIG. 8 is a block diagram depicting exemplary connections of portions of the exemplary microprocessor of FIG. 1.

FIG. 8 is a block diagram depicting exemplary connections of portions of the exemplary microprocessor of FIG. 1. Other interconnections are possible and contemplated. FPU 36 and reorder buffer 32 are depicted in FIG. 8. FPU 36 includes rename 1 unit 310, rename 2 unit 312, scheduler 314, execution pipelines 602, execution and pipeline control 340, and retire queue 316. FPU 36 is coupled to reorder buffer 32 via retire op 610, abort 612, completion tag 614, tag valid 616, and status 618. Retire queue 316 is coupled to retire op 610 and abort 612. Retire queue 316 is also coupled to rename 1 unit 310, rename 2 unit 312, and execution and pipeline control unit 340 via abort 622. Retire queue 316 is further coupled to execution and pipeline control 340. Execution and pipeline control is coupled to completion tag 614, tag valid 616, and status 618. Execution and pipeline control is also coupled to execution pipelines 602 via completion 624. Rename 1 unit 310 is coupled to rename 2 unit 312. Rename 2 unit 312 is coupled to scheduler 314. Scheduler 314 is coupled to execution and control unit 340 and execution pipelines 602. In one embodiment, execution pipelines 602 include load/add execution pipeline 320, load/ multiply execution pipeline 322, and load/store execution pipeline 326. Other embodiments may employ other execution pipelines. Each interconnection described herein should be construed to include a plurality of signals (i.e. a bus or multiple connections) where appropriate.

Instructions can be received in rename 1 unit 310 and conveyed through rename 2 unit 312, scheduler 314, and execution pipelines 602 as described above. In response to an instruction completing execution, a completion signal can be conveyed from execution pipelines 602 to execution and pipeline control 340 via completion 624. Execution and pipeline control 340 can be configured to convey a completion tag, a tag valid signal, and a status signal to reorder buffer 32 via completion tag 614, tag valid 626, and status 618, respectively.

Reorder buffer 32 can be configured to retire instructions in program order. In response to retiring a floating-point instruction, reorder buffer 32 can be configured to convey a retire op signal to retire queue 316 via retire op 610. Retire queue 316 can be configured to retire an entry as described above in response to receiving the retire op signal.

Reorder buffer 32 can be configured to detect an abort condition. Abort conditions can include traps, exceptions, reset, invalid data or other conditions. In response to detecting an abort condition, reorder buffer 32 can convey an abort signal to FPU 36 via abort 612. Retire queue 316 can be configured to receive the abort signal and can be configured to respond in the manner described above in FIG. 4A and FIG. 5. Retire queue 316 can also be configured to convey an abort signal via abort 622 to rename 1 unit 310, rename 2 unit 312, and execution and pipeline control 340 in response to receiving the abort signal from reorder buffer 32.

Figure 9:
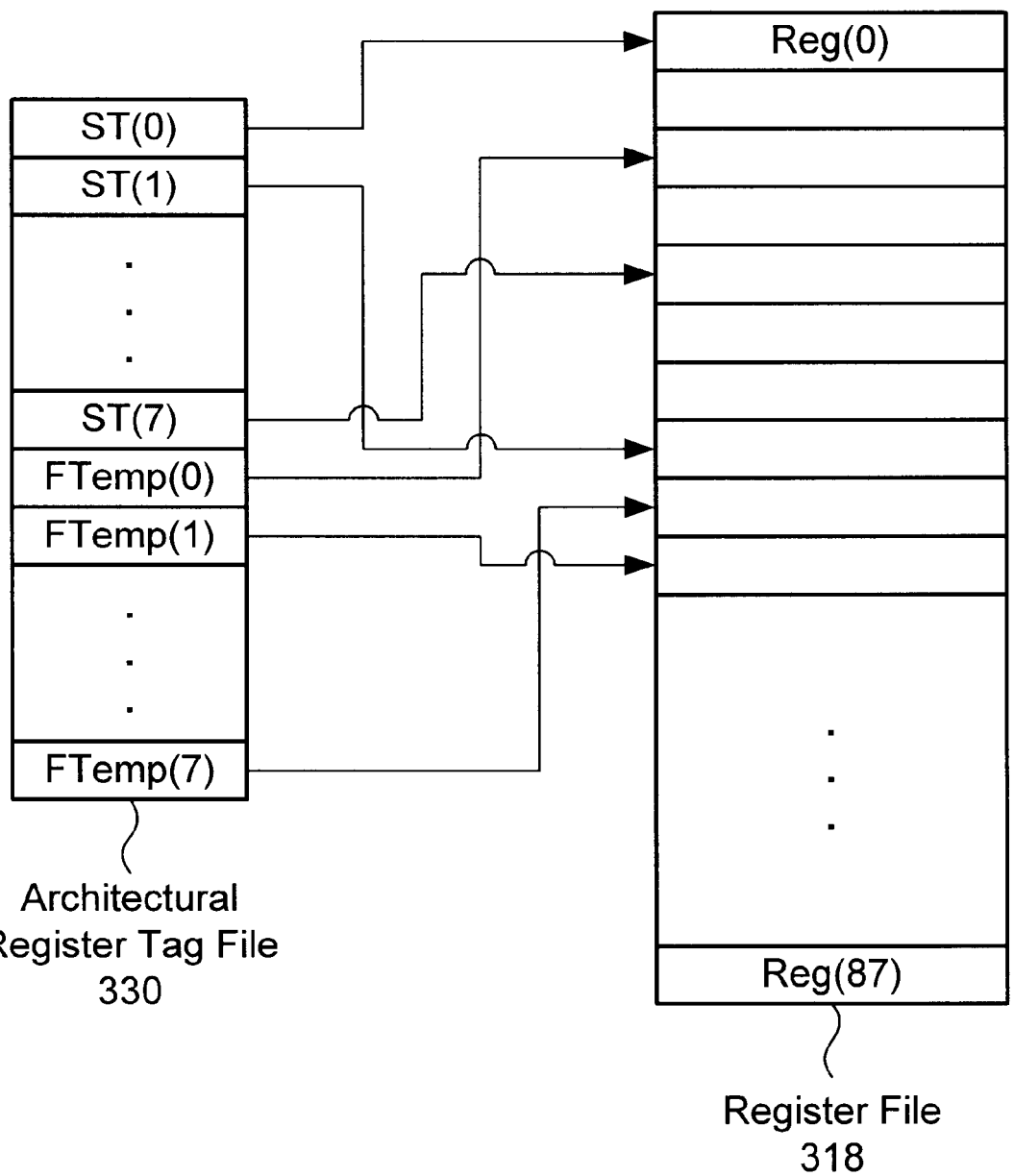
FIG. 9 is a block diagram depicting exemplary register file tags corresponding to an exemplary register file.

Turning now to FIG. 9, a block diagram depicting exemplary register file tags and an exemplary register file is shown. Architectural register tag file 330 and register file 318 are depicted. In the embodiment of FIG. 9, architectural register tag file 330 includes sixteen physical register tags that correspond to sixteen absolute register numbers. Register file 318 includes 88 physical registers, Reg(0) through Reg(87). The absolute register numbers include eight stack registers, ST(0) through ST(7), and eight microprocessor temporary registers, FTemp(0) through FTemp(7). In one embodiment, the microprocessor temporary registers are not accessible by the programmer and can be accessed only by microcode. Other numbers or configurations of register tags and/or registers are possible and contemplated.

In the embodiment shown in FIG. 9, architectural register tag file 330 includes sixteen, seven-bit physical register tags that each correspond to an absolute register number. The physical register tags each identify a physical register in register file 318. For example, the physical register tag corresponding to ST(0) identifies, or points to, Reg(0) as indicated by the arrow in FIG. 9. Other physical register tags identify other physical registers in register file 318 in a similar fashion. The physical register tags in architectural register tag file 330 can be accessed using architectural register identifiers. Tag future file 328 may be configured in a manner similar to the embodiment of architectural register tag file 330 shown in FIG. 9.

Figure 10A:
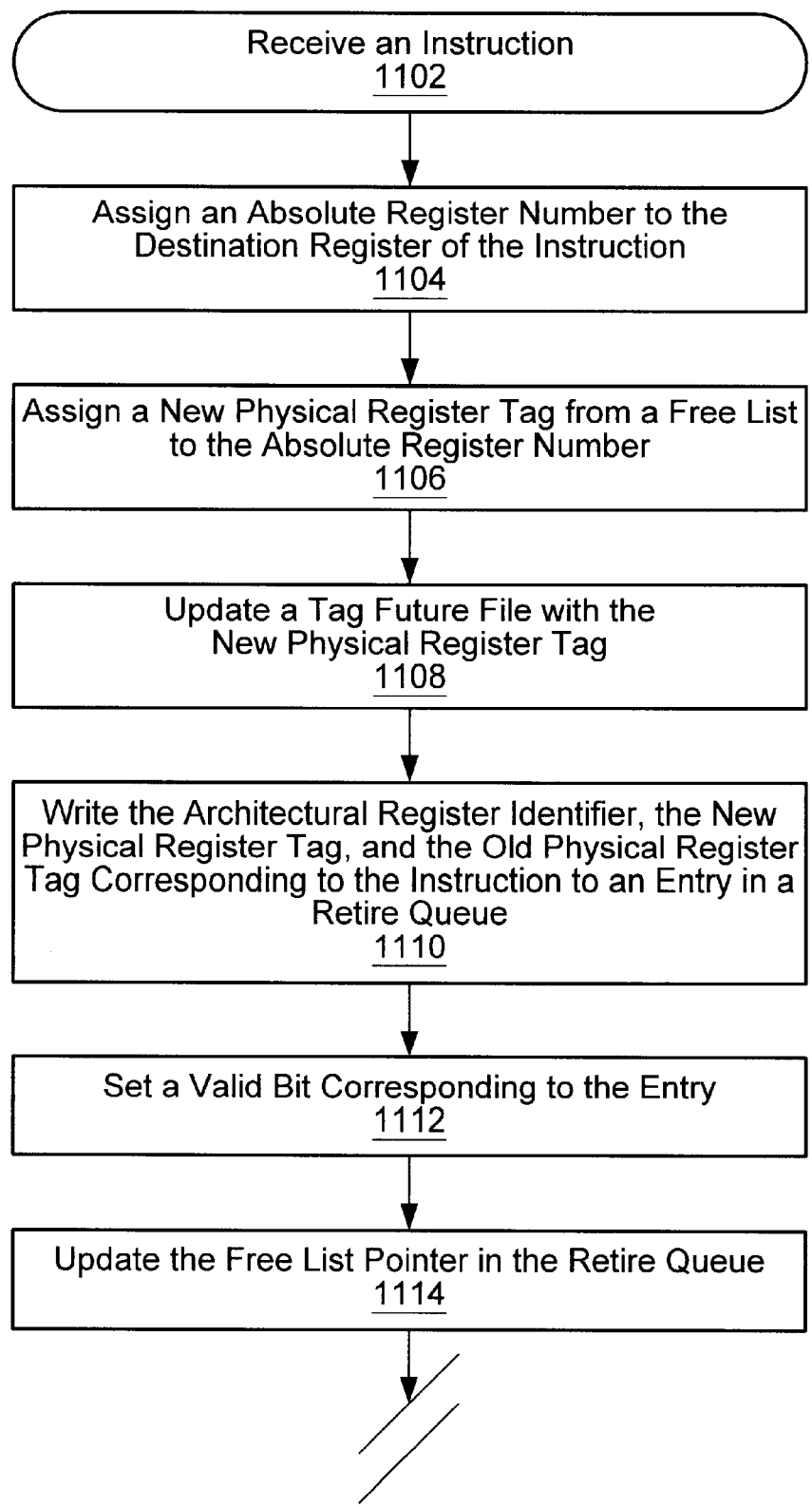
FIG. 10A is a first portion of a chart depicting a method for maintaining a free list.
Figure 10B:
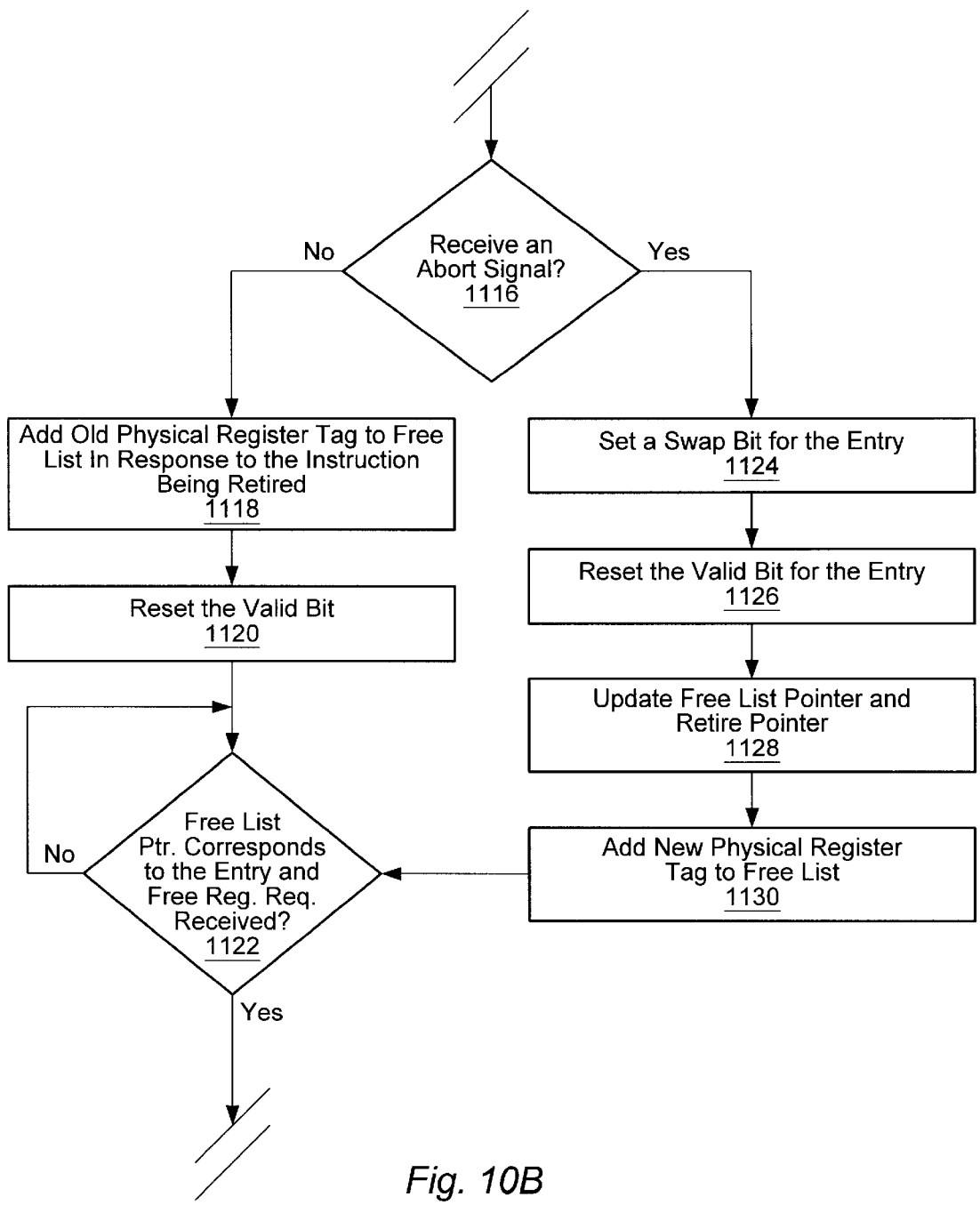
FIG. 10B is a second portion of a chart depicting a method for maintaining a free list.
Figure 10C:
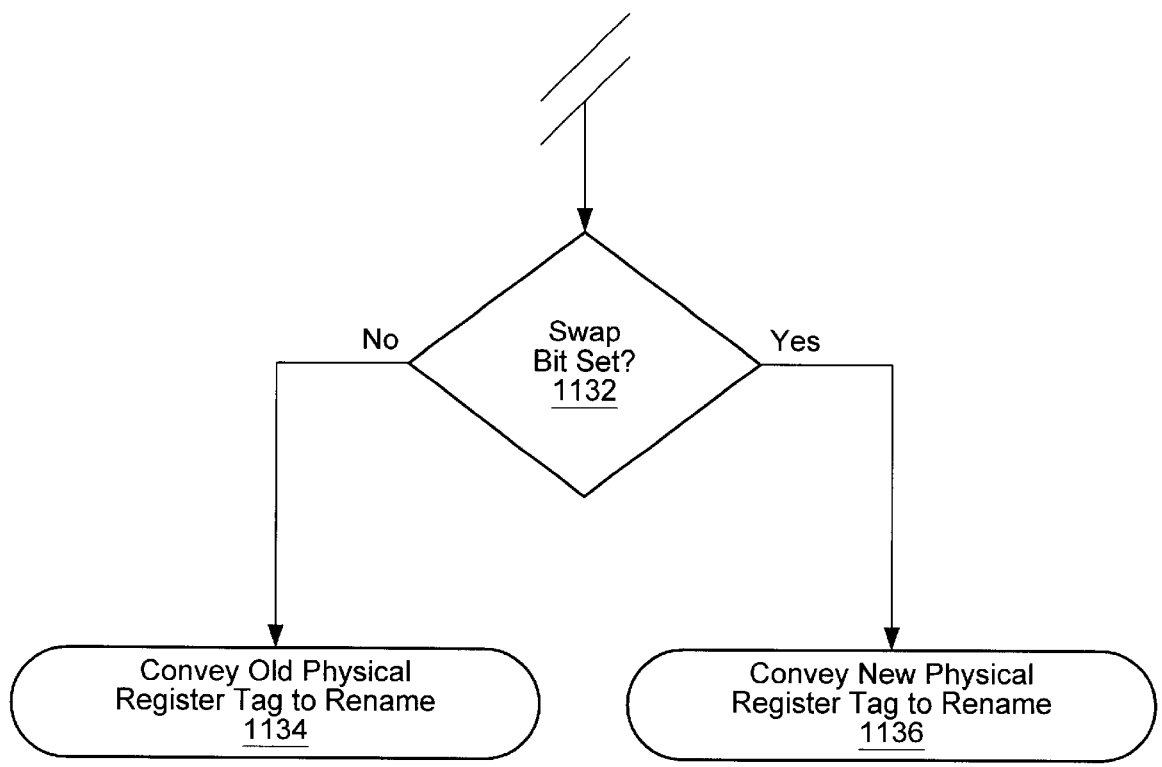
FIG. 10C is a third portion of a chart depicting a method for maintaining a free list.

Turning now to FIGS. 10A–10C, a chart depicting a method for maintaining a free list is shown. Variations on the method are possible and contemplated. Block 1102 shows receiving an instruction. Block 1104 shows assigning an absolute register number to the destination register of the instruction. Block 1106 shows assigning a new physical register tag from a free list to the absolute register number. Block 1108 shows updating a tag future file with the new physical register tag. Block 1110 shows writing the architectural register identifier, the new physical register tag, and the old physical register tag corresponding to the instruction to an entry in a retire queue. Block 1112 shows setting a valid bit corresponding to the entry. Block 1114 shows updating the free list pointer in the retire queue. Block 1116 shows determining whether an abort signal has been received. If an abort signal has not been received, the chart continues at block 1118. If an abort signal has been received, the chart can continue at block 1124. Block 1118 shows adding the old physical register tag to the free list in response to the instruction being retired. Block 1120 shows resetting the valid bit. Block 1124 shows setting a swap bit for the entry. Block 1126 shows resetting the valid bit for the entry. Block 1128 shows updating the free list pointer and retire pointer. Block 1130 shows adding the new physical register tag to the free list. Block 1122 shows determining whether the free list pointer corresponds to the entry and a free register request is received. If the free list pointer does not correspond to the entry or a free register request is not received, the chart continues at block 1122. If the free list pointer corresponds to the entry and a free register request is received, the chart continues at block 1132. Block 1132 shows determining whether the swap bit has been set. If the swap bit has not been set, the chart continues at block 1134. If the swap bit has been set, the chart continues at block 1136. Block 1134 shows conveying the old physical register tag to rename. Block 1136 shows conveying the new physical register tag to rename.

Turning to FIG. 10A, in response to receiving an instruction, as shown in block 1102, an absolute register number can be assigned to the destination register of the instruction as shown in block 1104. A new physical register tag from a free list can be assigned to the absolute register number as shown in block 1106, and a tag future file can be updated with the new physical register tag as shown in block 1008 after the old physical register tag is read from the tag future file. Retire data corresponding to the instruction can be stored in a retire queue. In one embodiment, storing the retire data can include writing the architectural register identifier, the new physical register tag, and the old physical register tag corresponding to the instruction to an entry in the retire queue as shown in block 1110. A valid bit corresponding to the entry can be set, as shown in block 1112, to indicate that the entry contains valid retire data. The free list pointer in the retire queue can be updated, as shown in block 1114, in response to conveying a free register tag for the instruction.

Continuing with FIG. 10B, a determination can be made as to whether an abort signal has been received as shown in block 1116. If an abort signal has been received, a swap bit corresponding to the entry can be set as shown in block 1124, and the valid bit corresponding to the entry can be reset as shown in block 1126. The free list pointer and retire pointer can be updated as shown in block 1128, and the new physical register tag can be added to the free list as shown in block 1130. If an abort signal has not been received, the old physical register tag can be added to the free list in response to the instruction being retired as shown in block 1118. The valid bit for the entry can be reset as shown in block 1120. The valid bit can be reset to indicate that the entry no longer contains valid retire data, i.e. the instruction corresponding to the entry has been retired. A determination can be made in block 1122 as to whether the free list pointer corresponds to the entry and a free register request has been received. If the free list pointer does not correspond to the entry or a free register request has not been received, then the chart remains at block 1122. If the free list pointer corresponds to the entry and a free register request has been received, then the chart can continue at block 1132 on FIG. 10C.

Continuing with FIG. 10C, a determination can be made as to whether the swap bit has been set for the entry as shown in block 1132. If the swap bit has been set, then the new physical register tag can be conveyed to a rename unit as shown in block 1136. In one embodiment, a set swap bit for the entry would indicate that an abort was received prior to the entry being retired. As a result, the old physical register tag of the entry cannot be freed and the new physical register tag can be conveyed instead in response to a free register request. If the swap bit has not been set, then the old physical register tag can be conveyed to a rename unit as shown in block 1134. In one embodiment, the entry was retired prior to an abort if the swap bit was not set. As a result, the old physical register tag would not be considered to be speculative and can be provided to a rename unit. A rename unit can use either the new physical register tag or the old physical register tag to implement a register renaming scheme.

Figure 11:
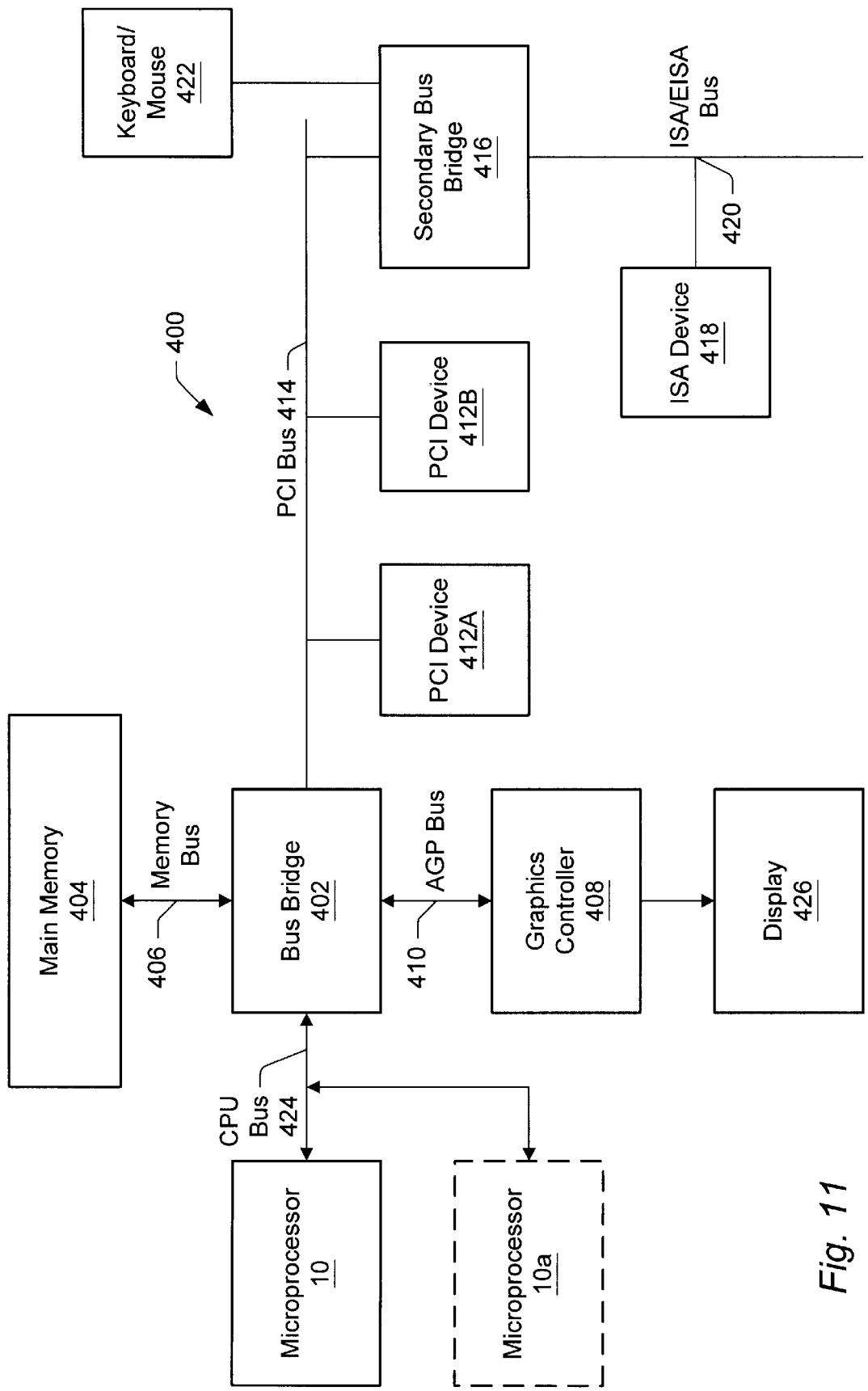
FIG. 11 is a block diagram of one embodiment of a computer system configured to utilize the microprocessor of FIG. 1.

Turning now to FIG. 11, a block diagram of one embodiment of a computer system 400 including microprocessor 10 is shown. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10a shown as an optional component of computer system 400). Microprocessor 10a may be similar to microprocessor 10. More particularly, microprocessor 10a may be an identical copy of microprocessor 10. Microprocessor 10a may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. A retire queue comprising:
 a plurality of entries, wherein each of said plurality of entries includes a swap bit, a valid bit, an architectural register identifier, a first register tag, and a second register tag; and
 a free list, wherein said free list includes said first register tag of each of said plurality of entries whose swap bit corresponds to a first value, and wherein said free list includes said second register tag for each of said plurality of entries whose swap bit corresponds to a second value and whose valid bit corresponds to said first value.

2. The retire queue as recited in claim 1, wherein said first register tag of each of said plurality of entries whose swap bit corresponds to said first value corresponds to a speculatively freed register tag.

3. The retire queue as recited in claim 1, wherein said valid bit of each of said plurality of entries is configured to correspond to said second value in response to said retire queue receiving an abort signal.

4. The retire queue as recited in claim 1, wherein said valid bit of one of said plurality of entries is configured to correspond to said first value in response to said one of said plurality of entries being written with retire data corresponding to an instruction.

5. The retire queue as recited in claim 4, wherein said valid bit of said one of said plurality of entries is configured to correspond to said second value in response to said instruction being retired.

6. The retire queue as recited in claim 1, wherein said swap bit of each of said plurality of entries whose valid bit corresponds to said first value is configured to correspond to said first value in response to receiving an abort signal.

7. A retire queue comprising:
 a plurality of entries, wherein each of said plurality of entries include a swap bit, a valid bit, an architectural register identifier, a first register tag, and a second register tag;
 a free list pointer configured to correspond to one of said plurality of entries; and
 a circuit coupled to said plurality of entries, wherein said circuit is configured to select said first register tag corresponding to said one of said plurality of entries as a free register tag in response to said swap bit corresponding to a first value, and wherein said circuit is configured to select said second register tag corresponding to said one of said plurality of entries as said free register tag in response to said swap bit corresponding to a second value.

8. The retire queue of claim 7, wherein said circuit comprises a multiplexer.

9. The retire queue of claim 7, wherein said circuit is configured to convey said free register tag in response to receiving a free register request signal.

10. A method comprising:
 receiving an abort signal in a retire queue;
 in response to a valid bit of an entry in said retire queue corresponding to a first value, setting a swap bit of said entry in said retire queue to said first value;
 adding a first register tag of said entry to a free list in response to said swap bit corresponding to a second value; and
 adding a second register tag of said entry to said free list in response to said swap bit corresponding to said first value.

11. The method of claim 10 further comprising:
 setting said valid bit to said second value in response to said setting said swap bit.

12. The method of claim 10 further comprising:
 updating a pointer corresponding to said free list in response to said receiving said abort signal.

13. The method of claim 10 further comprising:
 receiving a request signal in said retire queue;
 conveying said first register tag of said entry in response to said receiving said request signal and said swap bit corresponding to said second value as a free register tag; and
 conveying said second register tag of said entry in response to said receiving said request signal and said swap bit corresponding to said first value as said free register tag.

14. The method of claim 13 further comprising:
 receiving an instruction in a rename unit;
 conveying said request signal from said rename unit to said retire queue;
 receiving said free register tag in said rename unit;
 assigning said free register tag to said instruction; and
 writing said entry with retire data corresponding to said instruction.

15. The method of claim 14 further comprising:
 setting said valid bit to said first value in response to said writing.

16. The method of claim 14, wherein said writing includes:
 conveying an old register tag from said rename unit to said retire queue;
 conveying a new register tag from said rename unit to said retire queue;
 storing said new register tag as said second register tag; and
 storing said new register tag as said second register tag.

17. The method of claim 14 further comprising:
 configuring a pointer corresponding to said free list to point to a next entry in said retire queue.

18. The method of claim 14 further comprising:
 configuring a retire pointer to point to said entry in response to said entry being the oldest of a plurality of entries in said retire queue;
 receiving a completion signal corresponding to said instruction in said retire queue;
 adding said second register tag to said free list; and
 setting said valid bit to said second value in response to said receiving said completion signal.

19. An execution unit comprising:
 a retire queue, wherein said retire queue includes a plurality of entries, wherein each of said plurality of entries includes a swap bit, a valid bit, an architectural register identifier, a first register tag, and a second register tag; and
 a register rename unit coupled to said retire queue, wherein said register rename unit is configured to convey a free register request signal corresponding to an instruction to said retire queue;
 wherein said retire queue, in response to receiving said free register request signal, is configured to convey said first register tag of a first one of said plurality of entries to said register rename unit as a free register tag in response to said swap bit of said first one of said plurality of entries corresponding to a first value, and wherein said retire queue, in response to receiving said free register request signal, is configured to convey said second register tag of said first one of said plurality of entries to said register rename unit as said free register tag in response to said swap bit of said first one of said plurality of entries corresponding to a second value.

20. The execution unit of claim 19, wherein said retire queue is configured to set said swap bit of each of said plurality of entries whose valid bit corresponds to said first value to said first value in response to said retire queue receiving an abort signal.

21. The execution unit of claim 20, wherein said retire queue is configured to set said valid bit of each of said plurality of entries to said second value in response to receiving said abort signal.

22. The execution unit of claim 19, wherein said register rename unit is configured to convey retire data corresponding to said instruction to said retire queue, and wherein said retire queue is configured to store said retire queue entry data in said first one of said plurality of entries.

23. The execution unit of claim 22, wherein said retire queue is configured to set said valid bit of said first one of said plurality of entries to said first value in response to storing said retire queue entry data.

24. The execution unit of claim 23, further comprising:
a retire pointer coupled to said retire queue, wherein said retire pointer is configured to correspond to said first one of said plurality of entries in response to said first one of said plurality of entries corresponding to the oldest of said plurality of entries; and
an architectural register tag file coupled to said retire queue, wherein said architectural register tag file is configured to store a plurality of architectural register tags that correspond to a plurality of registers;
wherein said retire queue is configured to convey said architectural register identifier and said second register tag to said architectural register tag file in response to receiving a completion signal corresponding to said instruction.

25. The execution unit of claim 24, wherein said architectural register tag file is configured to store said second register tag in one of said plurality of architectural register tags that corresponds to said architectural register identifier.

26. The execution unit of claim 24, wherein said retire queue is configured to set said valid bit of said first one of said plurality of entries to said second value.

27. The execution unit of claim 24, wherein said retire pointer is configured to correspond to a second one of said plurality of entries in response to said retire queue conveying said architectural register identifier and said second register tag to said architectural register tag file.

28. The execution unit of claim 19, further comprising:
a free list pointer coupled to said retire queue, wherein said free list pointer is configured to correspond to said first one of said plurality of entries, and wherein said free list pointer is configured to correspond to a second one of said plurality of entries in response to said retire queue conveying said free register tag.

29. A microprocessor comprising:
a reorder buffer; and
an execution unit coupled to said reorder buffer, wherein said execution unit includes:
a retire queue, wherein said retire queue includes:
a plurality of entries, wherein each of said plurality of entries includes a swap bit, a valid bit, an architectural register identifier, a first register tag, and a second register tag;
a retire pointer, wherein said retire pointer is configured to correspond to a first one of said plurality of entries, wherein said first one of said plurality of entries corresponds to an instruction; and
a free list, wherein said free list includes said first register tag of each of said plurality of entries whose swap bit corresponds to a first value, and wherein said free list includes said second register tag for each of said plurality of entries whose swap bit corresponds to a second value and whose valid bit corresponds to said first value;
an execution and pipeline control unit coupled to said retire queue; and
an execution pipeline coupled to said execution and pipeline control unit;
wherein said reorder buffer is configured to convey a retire op signal to said execution unit, and wherein said retire queue is configured to set said valid bit of said first one of said plurality of entries to said second value in response to said execution unit receiving said retire op signal.

30. The microprocessor of claim 29, wherein said reorder buffer is configured to convey an abort signal to said execution unit, and wherein said retire queue is configured to set said swap bit of said first one of said plurality of entries to said first value in response to said execution unit receiving said abort signal.

31. The microprocessor of claim 30, wherein said execution unit further comprises a register rename unit, wherein said retire queue is configured to convey an internal signal corresponding to said abort signal to said register rename unit in response to said execution unit receiving said abort signal.

32. The microprocessor of claim 29, wherein said execution pipeline is configured to convey a completion signal corresponding to said instruction to said execution and pipeline control unit, and wherein said execution and pipeline control unit is configured to convey a completion tag to said reorder buffer in response to receiving said completion signal.

33. The microprocessor of claim 32, wherein said execution and pipeline control unit is configured to convey a tag valid signal and a status signal to said reorder buffer in response to receiving said completion signal.

34. A computer system, comprising:
a microprocessor including:
a reorder buffer; and
an execution unit coupled to said reorder buffer, wherein said execution unit includes:
a retire queue, wherein said retire queue includes:
a plurality of entries, wherein each of said plurality of entries includes a swap bit, a valid bit, an architectural register identifier, a first register tag, and a second register tag;
a retire pointer, wherein said retire pointer is configured to correspond to a first one of said plurality of entries, wherein said first one of said plurality of entries corresponds to an instruction; and
a free list, wherein said free list includes said first register tag of each of said plurality of entries whose swap bit corresponds to a first value, and wherein said free list includes said second register tag for each of said plurality of entries whose swap bit corresponds to a second value and whose valid bit corresponds to said first value;

an execution and pipeline control unit coupled to said retire queue; and an execution pipeline coupled to said execution and pipeline control unit;

wherein said reorder buffer is configured to convey a retire op signal to said execution unit, and wherein said retire queue is configured to set said valid bit of said first one of said plurality of entries to said second value in response to said execution unit receiving said retire op signal;

an input/output (I/O) device coupled to said microprocessor and to another computer system, wherein said I/O device is configured to communicate between said microprocessor and said another computer system.

35. The computer system as recited in claim 34, wherein said I/O device comprises a modem.

* * * * *